3,169,872
METHOD OF INCREASING THE SOLUBILITY RATE OF FUMARIC ACID AND COMPOSITIONS

Robert L. Rau, Scarsdale, N.Y., assignor to Geigy Chemical Corporation, Greenburgh, N.Y., a corporation of Delaware
No Drawing. Filed Mar. 8, 1963, Ser. No. 263,692
18 Claims. (Cl. 99—78)

The present invention relates to a method of increasing the solubility rate of fumaric acid in water and, especially, in cold water. This invention also pertains to fumaric acid compositions having improved solubility characteristics and to processes for making such fumaric acid compositions.

Heretofore, citric acid has been employed as the main acidulant in dehydrated beverage powders capable of being re-hydrated in cold water. But it would be of great commercial advantage if fumaric acid could be used as flavor-acidifier in place of citric acid. Fumaric acid has many properties which make its use for such purpose commercially attractive. For example, fumaric acid enhances the flavor in certain uses. Fumaric acid is less hygroscopic and dry mixes containing fumaric acid stay dry and free-flowing longer with less product break-down from acid hydrolysis than do mixes containing other acidulants. In addition, use of fumaric acid can mean an approximate 40 to 60% saving in food acid costs because of its lower price and because less is required to obtain equivalent taste response. Studies have shown that in carbonated beverages, the taste of two pounds of fumaric acid is equivalent to that provided by three pounds of citric acid. In non-carbonated orange fruit drinks three pounds of fumaric acid is equivalent to five pounds of citric acid while in non-carbonated fruit drinks, such as, pineapple-grapefruit and pineapple-orange drinks, four pounds of fumaric acid is equivalent to seven pounds of citric acid, on a taste basis. Such 2:3, or better, replacement ratio applies as well in wines, jams, jellies confections, etc., i.e., wherever fumaric and citric acids are employed as flavor-acidulants.

Thus, but for one important drawback, fumaric acid could be used more advantageously than citric acid. Fumaric acid has a very low rate of solubility in cold water. While the dry beverage powders of commerce are rehydratable in cold water in less than one minute, the use of fumaric acid in such powders in the past has been impossible due to the fact that the fumaric acid does not dissolve rapidly in cold water, periods as long as 24 hours at times not being sufficient to put all of the fumaric acid into solution.

Food processors and fumaric acid producers have therefore been greatly concerned with this solubility problem and have made some progress in overcoming it. For example, U.S. Patent No. 3,009,819 teaches that the rate of solubility of fumaric acid may be increased by mixing fumaric acid with a partial long chain fatty acid ester of a polyoxyethylene derivative of a hexitol anhydride derived from sorbitol. U.S. Patent No. 3,011,894 discloses that the rate of solubility of fumaric acid may be increased by mixing fumaric acid with a chloride salt such as sodium chloride and ammonium chloride in the presence of moisture and drying the mixture. And U.S. Patent No. 3,016,299 relates to means of increasing the cold-water solubility of fumaric acid by preparing a close physical mixture of fumaric acid and sugar.

It has now been found that the rate of solubility of fumaric acid may be greatly increased by mixing fumaric acid with a chelating agent. It is not known exactly how or why chelating agents improve the rate of solubility of fumaric acid but it is believed that these derivatives have a solubilizing effect over and above the effect obtained by reducing fumaric acid to a fine powder.

While ethylenediaminetetraacetic acid (EDTA) and nitrilotriacetic acid (NTA) are preferred chelating agents in accordance with this invention, it is possible to employ other chelating agents which correspond to the following general formula:

wherein X is selected from the group consisting of H, —CH$_2$COOH, —CH$_2$CH$_2$OH, —CH$_2$CH$_2$COOH and

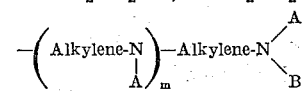

wherein alkylene is a low molecular weight bivalent alkyl group which places 1–3 carbon atoms between the nitrogens, such as, methylene, ethylene, propylene, isopropylene and cyclohexylene; A and B are selected from the group consisting of H, —CH$_2$COOH, —CH$_2$CH$_2$OH but A and B need not be the same and not more than one of A, B, or X is hydrogen; $m$ has a value of 0, 1 and 2.

Typical compounds coming within the scope of the formula and which are susceptible to this use are glycine, diglycine, triglycine, triethanolamine, monoethanolethylene diaminetriacetic acid, diethanolethylenediaminediacetic acid, 1,2-diamino-cyclohexanetetraacetic acid, triaminopropanehexaacetic acid and polymers of ethylene diamine containing hydroxy alkyl and carboxymethyl groups on the amino hydrogen positions. Compounds of this type are those derived from diethylenetriamine, triethylenetetramine and tetraethylenepentamine.

The chelating agent employed is preferably in the form of an axial metal salt and/or its alkaline-earth metal complexes. Thus for example, compositions containing disodium ethylenediaminetetraacetate (Na$_2$EDTA), disodium calcium ethylenediaminetetraacetate (Na$_2$Ca EDTA), trisodium nitrilotriacetate (Na$_3$ NTA), etc., constitute preferred embodiments.

In producing the fumaric acid composition of this invention, the fumaric acid and the chelating agent to be used can be of a particle size ranging between about 20 and 300 U.S. Standard mesh. Thus, they can be used in their commercial form or ground to effect size reduction, as desired. For each part by weight of fumaric acid from 0.01 to 1 part by weight of chelating agent can be employed. However, a ratio of 1 part of fumaric acid to 0.05 to 0.5 part of chelating agent is preferred; especially preferred is a ratio of 1 part of fumaric acid to 0.1 part of chelating agent.

The fumaric acid and chelating agent are mixed to obtain a homogeneous mixture. The mixture is then moistened by the addition of sufficient water to yield a paste and stirred to form such paste. While it is preferred to use water as the moisture source, other suitable solvents in which both the fumaric acid and the chelating agent are soluble may be employed. The paste is then dried and the dried material is granulated by screening through a sieve to give the desired particle size.

The following description illustrates several embodiments of the present invention but it is to be understood that this description is for purposes of illustration only and that the invention is not limited thereto since various changes can be made by those skilled-in-the-art without departing from its scope and spirit.

Mixtures of fumaric acid and chelating agent were prepared step-wise as follows:

(1) 10 parts of fumaric acid (Monsanto Food-Grade—about 100 U.S. Standard mesh size) plus 1 part of chelating agent were mechanically mixed.

(2) A paste was formed by the addition of 2 parts of distilled water and by stirring with a slurry bar.

(3) The paste was then dried to constant weight in a mechanical convention oven at 65±1° C.

(4) The powder was next ground to give particles passing through a 100 U.S. Standard mesh size sieve.

The fumaric acid compositions thus prepared were the following:

(1) Fumaric acid and $Na_2$ EDTA
(2) Fumaric acid and $Na_2Ca$ EDTA
(3) Fumaric acid and $Na_3$ NTA For comparative purposes a fumaric acid composition containing sodium chloride (U.S. Patent No. 3,011,894) was similarly prepared.

The solubility rate was determined in accordance with the following procedure:

A mixture (0.845 g.) of fumaric acid and chelating agent was added to a 600 ml. beaker. Distilled water (500 ml.—4° C.) was then rapidly added and a magnetic stirrer was used for agitation. After 1 minute of agitation the mixture was filtered and 25 ml. of the filtrate was titrated with .1 N NaOH to a phenolphthalein endpoint. From titration values the solubility in grams/2 quarts of water was calculated.

$Na_2$ EDTA, $Na_2Ca$ EDTA and $Na_3$ NTA increased the solubility more than sodium chloride in the tests made as presented in the following table:

TABLE

*Solubility of fumaric acid, g./2 quarts after one minute*

|  | g./2 Quarts | Increase Over Fumaric Alone |
|---|---|---|
| Fumaric Acid | 1.54 | 0 |
| Fumaric Acid + NaCl | 1.59 | 3.2 |
| Fumaric Acid + $Na_2Ca$ EDTA | 1.82 | 18.2 |
| Fumaric Acid + $Na_2$ EDTA | 2.11 | 37.0 |
| Fumaric Acid + $Na_3$ NTA | 2.12 | 37.6 |

What is claimed is:

1. A method of increasing the rate of solubility of fumaric acid by forming a mixture of fumaric acid and a chelating agent of the formula

wherein X is selected from the group consisting of H, —$CH_2COOH$, —$CH_2CH_2OH$, —$CH_2CH_2COOH$ and

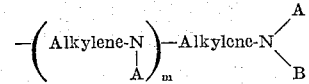

wherein

Alkylene is a low molecular weight bivalent alkyl group which places 1–3 carbon atoms between the nitrogens, selected from the group consisting of methylene, ethylene, propylene, isopropylene and cyclohexylene;

A and B are selected from the group consisting of H, —$CH_2COOH$, —$CH_2CH_2OH$ but not more than one of A, B, and X is hydrogen;

m has a value of 0, 1 and 2 which comprises mixing the fumaric acid and chelating agent in the presence of moisture and drying said mixture.

2. A method according to claim 1 wherein said chelating agent is selected from the group consisting of ethylenediaminetetraacetic acid and nitrilotriacetic acid and their alkali metal salts, their alkaline-earth metal complexes and the alkaline-earth metal complexes of their alkali metal salts.

3. A method according to claim 2 wherein said chelating agent is selected from the group consisting of disodium ethylenediaminetetraacetate, disodium calcium ethylenediaminetetraacetate and trisodium nitrilotriacetate.

4. A method of increasing the rate of solubility of fumaric acid in cold water by forming a mixture of fumaric acid and a chelating agent of the formula

wherein X is selected from the group consisting of H, —$CH_2COOH$, —$CH_2CH_2OH$, —$CH_2CH_2COOH$ and

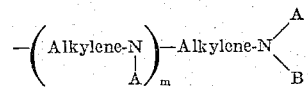

wherein

Alkylene is a low molecular weight bivalent alkyl group which places 1–3 carbon atoms between the nitrogens, selected from the group consisting of methylene, ethylene, propylene, isopropylene and cyclohexylene;

A and B are selected from the group consisting of H, —$CH_2COOH$, —$CH_2CH_2OH$ but not more than one of A, B, and X is hydrogen;

m has a value of 0, 1 and 2 which comprises mixing about 1 part by weight of fumaric acid with about 0.01 to 1 part by weight of said chelating agent, adding a sufficient amount of water to said mixture to yield a paste, mixing the water into said mixture, drying said moistened mixture and granulating the dried mixture to the desired particle size.

5. A method according to claim 4 wherein said chelating agent is selected from the group consisting of ethylenediaminetetraacetic acid and nitrilotriacetic acid and their alkali metal salts, their alkaline-earth metal complexes and the alkaline-earth metal complexes of their alkali metal salts.

6. A method according to claim 5 wherein said chelating agent is selected from the group consisting of disodium ethylenediaminetetraacetate, disodium calcium ethylenediaminetetraacetate and trisodium nitrilotriacetate.

7. A method according to claim 4 wherein per part by weight of fumaric acid from about 0.05 to about 0.5 part by weight of chelating agent is used.

8. A method according to claim 7 wherein per part by weight of fumaric acid about 0.1 part by weight of chelating agent is used.

9. A method according to claim 4 wherein the dried fumaric acid composition is granulated through a 100 U.S. Standard mesh screen.

10. A fumaric acid composition having an increased rate of solubility in cold water which comprises an admixture of fumaric acid and a chelating agent of the formula

wherein X is selected from the group consisting of H, —$CH_2COOH$, —$CH_2CH_2OH$, —$CH_2CH_2COOH$, and

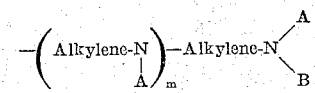

wherein

Alkylene is a low molecular weight bivalent alkyl group which places 1–3 carbon atoms between the nitrogens, selected from the group consisting of methylene, ethylene, propylene, isopropylene and cyclohexylene;

A and B are selected from the group consisting of H, —$CH_2COOH$, —$CH_2CH_2OH$ but not more than one of A, B and X is hydrogen;

m has a value of 0, 1 and 2.

11. A fumaric acid composition according to claim 10 wherein said chelating agent is selected from the group consisting of ethylenediaminetetraacetic acid and nitrilotriacetic acid and their alkali metal salts, their alkaline-earth metal complexes and the alkaline-earth metal complexes of their alkali metal salts.

12. A fumaric acid composition according to claim 10 wherein said chelating agent is selected from the group consisting of disodium ethylenediaminetetraacetate, disodium calcium ethylenediaminetetraacetate and trisodium nitrilotriacetate.

13. A fumaric acid composition according to claim 10 which passes through a 100 U.S. Standard mesh screen.

14. A fumaric acid composition having an increased rate of solubility in cold water which comprises an admixture of 1 part by weight of fumaric acid and from about 0.01 to 1 part by weight of a chelating agent of the formula

wherein X is selected from the group consisting of H, —CH$_2$COOH, —CH$_2$CH$_2$OH, —CH$_2$CH$_2$COOH and

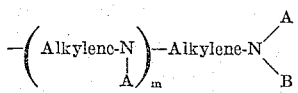

wherein
Alkylene is a low molecular weight bivalent alkyl group which places 1–3 carbon atoms between the nitrogens, selected from the group consisting of methylene, ethylene, propylene, isopropylene and cyclohexylene;

A and B are selected from the group consisting of H, —CH$_2$COOH, —CH$_2$CH$_2$OH but not more than one of A, B, and X is hydrogen;
$m$ has a value of 0, 1 and 2.

15. A fumaric acid composition according to claim 14 wherein said chelating agent is selected from the group consisting of ethylenediaminetetraacetic acid and nitrilotriacetic acid and their alkali metal salts, their alkaline-earth metal complexes and the alkaline-earth metal complexes of their alkali metal salts.

16. A fumaric acid composition according to claim 15 wherein said chelating agent is selected from the group consisting of disodium ethylenediaminetetraacetate, disodium calcium ethylenediaminetetraacetate and trisodium nitrilotriacetate.

17. A fumaric acid composition according to claim 14 which comprises an admixture of 1 part by weight of fumaric acid and from about 0.05 to about 0.5 part by weight of chelating agent.

18. A fumaric acid composition according to claim 17 which comprises an admixture of 1 part by weight of fumaric acid and 0.1 part by weight of chelating agent.

References Cited by the Examiner
UNITED STATES PATENTS

| | | | |
|---|---|---|---|
| 3,005,715 | 10/61 | Raffensperger et al. | 99—78 |
| 3,009,810 | 11/61 | Raffensperger et al. | 99—78 |
| 3,011,894 | 12/61 | Block et al. | 99—78 |
| 3,016,299 | 1/62 | Raffensperger et al. | 99—78 |
| 3,108,002 | 10/63 | Raffensperger et al. | 99—78 |

A. LOUIS MONACELL, *Primary Examiner.*